March 2, 1948.
W. A. HIGINBOTHAM    2,436,890
MODULATED SAW TOOTH SWEEP GENERATOR
Filed Jan. 24, 1945
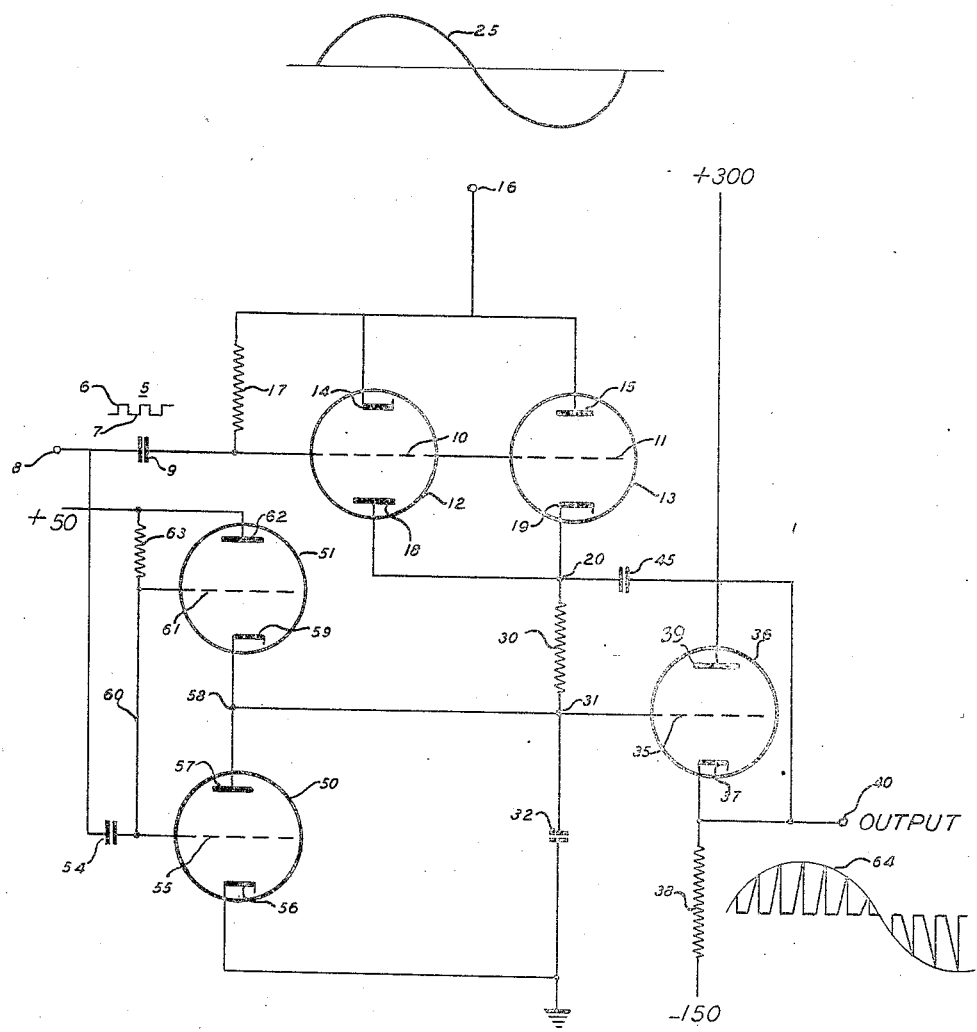
INVENTOR.
WILLIAM A. HIGINBOTHAM
BY
William D. Hall
Attorney Patented Mar. 2, 1948

2,436,890

UNITED STATES PATENT OFFICE 2,436,890

MODULATED SAW-TOOTH SWEEP GENERATOR

William A. Higinbotham, Santa Fe, N. Mex., assignor, by mesne assignments, to the United States of America, as represented by the Secretary of War Application January 24, 1945, Serial No. 574,375

2 Claims. (Cl. 179—171.5)

The present invention relates to a saw-tooth sweep generator and more particularly to a sweep generator in which the magnitude and polarity of the saw-tooth voltage cycles are determined by a modulating voltage.

A saw-tooth voltage, so called because the voltage wave form resembles the cutting edge of a saw, is produced by a sweep generator and is generally of fixed magnitude and polarity in all its cycles. Such a voltage often is used to provide a linear time base for a cathode ray tube presentation.

Certain forms of presentation, however, such as that disclosed in copending application of Luis W. Alvarez, Serial No. 542,287, filed June 27, 1944, require deflection of the tube's electron beam in other predetermined manners.

One of the objects of this invention is to provide a circuit for generating a sweep voltage whose successive cycles vary in magnitude and polarity in accordance with a modulating voltage having a frequency relatively somewhat lower than that of the sweep voltage.

Another object is to provide means for improving the linearity of individual cycles of a saw-tooth sweep voltage.

Other objects and advantages will appear more fully from the following detailed description taken in connection with the accompanying drawing in which is shown a schematic diagram illustrating one embodiment of the present invention.

A rectangular voltage wave 5, having positive gate portions 6 and relatively negative gate portions 7, is applied to an input terminal 8. The voltage 5 passes through a capacitance 9 to the control grids 10 and 11 of a pair of vacuum tubes 12 and 13 which function as electronic switches.

The cathode 14 and anode 15 of tubes 12 and 13 respectively are connected together and to an input terminal 16. A grid return resistance 17 is connected as shown between the grid 10 and the cathode 14 of tube 12. The anode 18 and cathode 19 of tubes 12 and 13 respectively are connected together at a junction 20.

A control or modulating voltage, indicated generally at 25, is applied at the terminal 16 to control the characteristics of the saw-tooth generator in a manner hereinafter described. The rectangular or timing voltage 5 applied to the control grids 10 and 11 of tubes 12 and 13 respectively determines generally the conducting characteristics of the two tubes. Although during the positive gate 6 of voltage 5 the two switch tubes 12 and 13 are in condition to conduct, actual conduction of one tube or the other depends upon the polarity and magnitude of the voltage applied at terminal 16. During the negative gate 7 of voltage 5, both tubes 12 and 13 are nonconductive.

When the grids 10 and 11 of tubes 12 and 13 are positive due to the positive gate 6, one of the tubes (depending upon the instantaneous polarity of voltage 25 at terminal 16) will be conducting to communicate the voltage of terminal 16 to the junction 20. Thus if the instantaneous voltage at terminal 16 is negative, tube 12 is conducting, and the voltage at junction 20 is correspondingly negative. On the other hand, if the voltage 25 is positive, tube 13 is conducting, and the voltage at junction 20 is correspondingly positive.

A resistance 30, of relatively large value and therefore termed a limiting resistance, has one end connected to the junction 20 and its other end connected to a junction 31. A capacitance 32 has one terminal connected to junction 31, the other terminal thereof being grounded. Capacitance 32 and resistance 30 comprise a series R—C circuit, the saw-tooth or sweep voltage generated by the present circuit being developed across capacitance 32, which is therefore hereinafter termed a "sweep" capacitance.

The junction 31 is connected to the control grid 35 of a cathode follower tube 36. Tube 36 has its cathode 37 connected, as shown, through a resistance 38 to a source of negative bias potential. The bias potential tends to prevent the tube from being driven below cut-off by negative saw-tooth voltages applied to grid 35. The anode 39 is connected, as shown, to a suitable source of positive potential. The cathode 37 is connected to an output terminal 40, the output voltage of the circuit thus being taken effectively across resistance 38.

A capacitance 45, having a relatively large value, is connected between the cathode 37 and the junction 20. As will appear, the capacitance 45 has a dual purpose in the circuit, one purpose being to temporarily store a charge corresponding to the voltage appearing at junction 20, the other purpose being to provide feed-back to improve the linearity of the generated saw-tooth waves. The capacitance 45 will hereinafter be termed a storage capacitance.

As previously mentioned, during the time of a positive gate 6, the particular value of voltage 25 applied to the terminal 16 is communicated through one of the two tubes 12 or 13 to the junction 20. The voltage appearing at the junction 20 causes a relatively rapid charging or discharging of the storage capacitance 45 to the then existing value of voltage at terminal 16. When a following negative gate 7 is applied to the grids 10 and 11, the theretofore conducting tube 12 or 13 is cut off, thus opening the circuit between the terminal 16 and the junction 20. The capacitance 45 thereupon discharges in the circuit containing resistance 30, sweep capacitance 32, the source of bias potential and resistance 38. Capacitance 32 thereby charges in an approximately linear manner as determined by the R—C characteristics of the circuit, the potential at junction 20, and the time duration of negative gate 7. Storage capacitance 45 is relatively large as compared to sweep capacitance 32, and the drop in potential at junction 20 due to transfer of charge from the storage capacitance to the sweep capacitance is small.

There is thus formed across capacitance 32 a saw-tooth voltage wave whose frequency is equal to that of the timing voltage 5 applied to terminal 8, the discharge of sweep capacitance 32 taking place during the period of the positive gate in a manner presently to be described. The voltage developed at junction 31 is communicated to grid 35 of cathode follower 36, thus to provide an output voltage therefrom at terminal 40 corresponding to the wave form developed across capacitance 32.

In the usual development of a voltage across a capacitance by virtue of a capacitance being charged from a source at constant potential, the time rate of rise of capacitance voltage is not linear but falls off exponentially. As here shown, this exponential variation may be reduced and improved linearity achieved by substituting for the aforementioned constant potential a charging source whose potential is increased during a voltage cycle. The voltage at junction 20 of storage capacitance 45, which serves as a charging source for sweep capacitance 32, is adapted to be increased during a cycle by having the other terminal of the storage capacitance returned to cathode 37 of cathode follower 36, rather than returned to a point at ground potential. As the magnitude of the potential at cathode 37 increases during a saw-tooth voltage cycle, the potential at junction 20 is similarly raised. This feed-back or boot-strap effect serves to improve the linearity of the individual cycle of sweep voltage.

A pair of electronic switch tubes 50 and 51 are connected between the junction 31 and ground to permit rapid discharge of capacitance 32 at the completion of each period of sweep voltage. Two tubes are provided in order to permit discharge regardless of the polarity appearing at junction 31.

Rectangular timing voltage 5 (applied to input terminal 8) also is applied through a capacitance 54 to control grid 55 of the switch tube 50. The cathode 56 of switch tube 50 is grounded, and the anode 57 is connected to a junction 58. Junction 58 is connected to cathode 59 of switch tube 51, the junction also being connected to junction 31, thus to connect tube 50 across capacitance 32. The timing voltage 5 applied to terminal 8 is communicated through capacitance 54 and a lead 60 to the control grid 61 of vacuum tube 51. Anode 62 of switch tube 51 is connected to a suitable source of positive potential and grids 55 and 61 are also connected through resistance 63 to that source. The return of grids 55 and 61 to a positive potential tends to counteract the average negative charge which is built up on them by application of rectangular wave 5 to terminal 8.

During the time of positive gate 6 when one of the tubes 12 or 13 is conducting to impress a voltage on junction 20, the tubes 50 and 51 likewise are conducting to insure a discharged condition of the sweep capacitance 32. During the time of negative gate 7 when the storage capacitance 45 cooperates to charge sweep capacitance 32, tubes 50 and 51 are cut off to permit the charging of capacitance 32 and the consequent generation of the desired sweep voltage. Tubes 50 and 51 again become conducting upon occurrence of the next positive gate 6 to provide a discharge path for capacitance 32 at the completion of the period of sweep voltage. As mentioned, use of the two tubes 50 and 51 provides discharge of capacitance 32 regardless of polarity of voltage appearing at junction 31. Thus if the voltage at 31 is positive at the completion of a voltage sweep, it is the vacuum tube 50 which operates to discharge the capacitance 32. On the other hand, if the polarity at junction 31 is negative, vacuum tube 51 operates to discharge the capacitance 32.

From the foregoing description, it will be seen that the magnitude and polarity of the sweep voltage generated by the present circuit is under the direct control of the voltage 25 applied to terminal 16. For example, the voltage 25 may take the form of an alternating sine wave, as shown, of relatively low frequency as compared to the frequency of the sweep voltage generated. During the positive-going positive portion of voltage 25, the voltage appearing at junction 20 will be substantially a duplicate of voltage 25. The envelope or overall wave form of the saw-tooth voltage developed across capacitance 32 and at output terminal 40 likewise will correspond to the voltage at terminal 16, as shown at 64. Thus during the positive-going positive portion of voltage 25, the saw-tooth sweep voltage will be positive and of magnitude which increases in accordance with the increase in magnitude of the sine wave. During the negative-going positive portion of the sine wave 25, the saw-tooth wave will still have a positive polarity but a magnitude which decreases in accordance with the decreasing sine wave. During the negative-going negative portion of the sine wave, the generated saw-tooth voltage will have a negative polarity and a magnitude which increases as the sine wave increases in a negative direction. Finally, during the positive-going negative portion of the sine wave, the saw-tooth voltage is negative while the magnitude of successive waves decreases according to the sinusoidal decrease of voltage 25.

While a sinusoidal wave form has been discussed in connection with voltage 25, it will be readily apparent that other forms of voltage may be used at terminal 16 in order to obtain various predetermined magnitude and polarity sequences of cycles of sweep voltage.

The vacuum tubes are each shown in the drawing to be of individual triode type, but each may actually be one of several sets of elements mounted within a single shell. The commercial type 6SN7 tube, for example, has two medium-mu triodes mounted within a single shell, each triode being equivalent to commercial type 6J5. The various voltages indicated on the drawing are typical values which may be used with such medium-mu triodes to develop saw-tooth voltages having values up to plus or minus 50 volts, with good linearity.

Having thus described the invention, what is hereby claimed is:

1. In a voltage generator of the character described having associated therewith a source of charging voltage of variable magnitude and polarity, a sweep capacitance, a limiting resistance through which said sweep capacitance is charged, said limiting resistance being sufficiently high to prevent instantaneous charging of the sweep capacitance, said sweep capacitance and limiting resistance being series-connected, a storage capacitance, a charging circuit for said storage capacitance, said charging circuit having applied thereto said charging voltage, said storage capacitance constituting a source of charging voltage for said sweep capacitance, a discharging circuit for said sweep capacitance, and switch means causing both of said charging and discharging circuits alternately to be closed to communicate said charging voltage to said storage capacitance and to discharge said sweep capacitance, and to be opened to permit charging of said sweep capacitance by said storage capacitance, thus to develop a saw-tooth voltage output whose envelope is similar to the wave form of said charging voltage.

2. In a voltage generator of the character described having associated therewith a source of charging voltage of variable magnitude and polarity, a sweep capacitance, a limiting resistance through which said sweep capacitance is charged, said limiting resistance being high so as to introduce a definite charging time for the sweep capacitance, said sweep capacitance and limiting resistance being series-connected, a storage capacitance, a charging circuit for said storage capacitance, said charging circuit having applied thereto said charging voltage, said storage capacitance constituting a source of charging voltage for said sweep capacitance, a discharging circuit for said sweep capacitance, switch means causing both of said charging and discharging circuits alternately to be closed to communicate said charging voltage to said storage capacitance and to discharge said sweep capacitance, and to be opened to permit charging of said sweep capacitance by said storage capacitance, thus to develop a saw-tooth voltage output whose envelope is similar to the wave form of said charging voltage, and an output coupling circuit of cathode follower type, said circuit including a vacuum tube having at least a cathode, a grid and plate, said saw-tooth voltage output being applied to said grid, the final output of said circuit being developed at said cathode, said storage capacitance being connected between said charging circuit and said cathode.

WILLIAM A. HIGINBOTHAM.

REFERENCES CITED

The following references are of record in the file of this patent:

UNITED STATES PATENTS

| Number | Name | Date |
|---|---|---|
| 2,237,425 | Grieger et al. | Apr. 8, 1941 |
| 2,341,396 | Smith, Jr. | Feb. 8, 1944 |
| 2,363,822 | Wendt | Nov. 28, 1944 |